United States Patent Office 2,961,390
Patented Nov. 22, 1960

2,961,390

METHOD OF PREPARING URANIUM, THORIUM, OR PLUTONIUM OXIDES IN LIQUID BISMUTH

John K. Davidson and Walter L. Robb, Schenectady, and Oliver N. Salmon, Oneida, N.Y., assignors to the United States of America as represented by the United States Atomic Energy Commission No Drawing. Filed Apr. 4, 1957, Ser. No. 650,799

5 Claims. (Cl. 204—154.2)

The present invention relates to liquid metal compositions containing dispersed solid inorganic compounds of metals from which nuclear power may be derived.

In order to produce useful power from fissionable or fertile metals such as uranium, thorium and plutonium, it is necessary to transfer heat produced from the fissioning of the fuels to an apparatus capable of converting heat into other forms of useful energy. To facilitate the rapid removal of heat as it is produced, provision of a good heat transfer medium in thermal contact with the fuels is highly desirable. A solution of fissionable material in a liquid media provides the most intimate contact possible. It has been proposed to employ liquid metal media for this purpose because of their heat transfer properties and low vapor pressure. The choice of such metals is limited because of the unusual combination of properties required to permit their use in connection with nuclear reactors. Only a few metals, including lead and bismuth have the preferred combination. However the amount of fissionable and fertile materials which can be dissolved in these metals is limited, and therefore suspensions of particles of fissionable and fertile materials in liquid metals have been considered.

It is one of the objects of the present invention to provide compositions of fissionable and/or fertile materials in liquid metal media suitable for use in connection with nuclear reactors. Another object is to provide a method of forming compositions of fissionable and/or fertile materials in liquid metal media suitable for use in connection with nuclear reactors. Another object is to provide a number of compositions containing inorganic compounds in liquid metal media. Other objects will be in part apparent and in part pointed out hereinafter.

In one of its broader aspects one of the objects of the present invention may be achieved by forming compounds of thorium, uranium and plutonium and dispersing the compounds in finely divided form in the liquid metal media containing a metal additive in amounts capable of promoting the wetting of the compounds by the liquid metal media without completely reducing the compounds to the corresponding thorium, uranium or plutonium metal. The metal additive must lower the interfacial tension between the liquid metal medium and the solid compound to a value less than the surface tension of the solid compound to produce wetting. Strong reducing metal additives should be chemically attracted by the nonmetal atoms situated on the surface of the solid inorganic compound of uranium, thorium or plutonium and this should result in a lowering of the interfacial tension between the liquid metal medium and the solid compound.

The solubility of uranium and thorium in such metals as liquid bismuth and solutions of lead and bismuth is limited to not more than a fraction of a percent at temperatures below 500° C. It has been discovered that it is possible to provide a composition having desirable flow and heat transfer properties by forming compounds of the metals to be dispersed and dispersing them in finely divided form in the liquid metal media. It has further been found that when concentrations of a compound of a metal such as uranium are present in liquid metal media in excess of the solubility of such metals in such media, it is possible to maintain the compound in the dispersed form and to flow the composition as a liquid.

A number of the advantages of the subject invention will be apparent from the description of a number of specific examples of compositions and their methods of preparation which follow. It will be understood that the scope of the invention is not limited to or by the examples.

*Example 1*

A right cylindrical capsule of 10–10 low carbon steel having a four inch length, a one inch outside diameter, and a wall thickness of approximately 0.015 inches was loaded with 173.25 grams of bismuth, 7.94 grams of ball-milled $UO_2$ powder, and 2.39 grams of $UH_3$ powder. On a weight basis, the median particle size of the $UO_2$ was four microns, and that of the $UH_3$ was in the range of between 5 and 10 microns. The atom ratio of the total oxygen content to the total of the uranium content in the capsule was about 1.6 and the weight percent of the total quantity of uranium both as $UO_2$ and $UH_3$ which was added to the capsule was approximately 5.10% of the weight of bismuth added. A steel cover was sealed on the capsule by argon arc welding at an argon pressure of approximately one tenth of an atmosphere.

The sealed capsule was placed in a quartz chamber and was heated in vacuum in a cylindrical resistance furnace for 96 hours at 400° C., for 20 hours at 500° C. and finally for 90 hours at 600° C. During the periods at 400 and 500° C. the $UH_3$ dissociated into uranium metal powder and hydrogen gas. The hydrogen diffused through the iron wall of the capsule and was pumped out of the furnace during the period at 600° C. Also during the period at 600° C. the quartz chamber containing the capsule was detached several times from the vacuum system and the capsule was shaken manually for above five minutes while still hot to disperse the $UO_2$-U powder in the liquid bismuth. During the shaking operation the capsule was held firmly against the inside of the quartz chamber by an alnico magnet.

At the end of the heating period at 600° C. the capsule was shaken vigorously while still hot to disperse the $UO_2$-U powder uniformly in the liquid bismuth and was then allowed to cool to room temperature. It is estimated that the bismuth solidified within twenty minutes after the end of the shaking operation. After cooling to room temperature the region of the capsule containing the Bi-$UO_2$-U slurry was cut into five horizontal sections about ½ to 1 centimeter thick. The five sections were subjected to chemical, metallographic, X-ray, fluorescent, and X-ray diffraction analyses. The results of the chemical analyses are shown in the following Table 1 in which the sections are numbered in increasing order from bottom to top.

TABLE 1

| Section No. | Weight percent Total Uranium | Section Thickness in Centimeters |
|---|---|---|
| 1 | 3.25 | 0.5 |
| 2 | 7.78 | 0.6 |
| 3 | 5.82 | 0.9 |
| 4 | 4.22 | 1.1 |
| 5 | 4.03 | 1.0 |

It will be seen that if these results are averaged, taking into account the section thickness, the weight percent of the total uranium in the combined sections is 4.93. This compares favorably with the 5.10 value added initially. From this example it is evident that a fairly uniform macroscopic distribution of $UO_2$-U powder can be produced in bismuth by agitation. Agitation is sufficient, as well, to distribute the uranium between the bottom and top of the capsule without appreciable variations. This is indicated both by X-ray fluorescence analyses of each section of the capsule and by the chemical analyses listed in the table. X-ray diffraction studies of a polished bismuth surface from sections 1 and 5 showed that only $UO_2$ and bismuth were present to the extent that could be detected. Concentration of UBi or UO, which might have been present, was too low to be detected.

Metallographic examination of polished bismuth surfaces in sections 1 and 2 showed that the $UO_2$ powder was not all microscopically dispersed in the bismuth. $UO_2$ appears to be present in small patches ranging from a few microns up to 500 microns in cross section. Greater agitation must be applied to give a uniform microscopic dispersion. Where uniform macroscopic dispersions are satisfactory the procedure described can be employed.

The metallographic examination also showed that the bismuth wet the $UO_2$ and filled up the tiny interstices in the $UO_2$ particles in any given patch. The $UO_2$ particles were also firmly imbedded in a bismuth matrix. The $UO_2$ of the sample was also somewhat darker gray in appearance under microscopic examination than normal $UO_2$. The finding of a small amount of an unidentified rectangular shaped crystal was taken to indicate the presence of some compound of uranium and bismuth.

The container used in this example was also examined metallographically. Little if any attack of the low carbon steel by the bismuth $UO_2$-U slurry was indicated after 90 hours at 600° C. Reaction at the internal surface of the container was limited to a zone which could not have been more than a few microns in thickness.

*Example II*

Several sealed capsules were prepared, filled and heated substantially as described in Example I to verify whether $UO_2$ could be dispersed in liquid bismuth at 500° to 700° C. with or without powdered uranium getters present. Capsules of both 10–10 low carbon steel and type 304 stainless steel having outside dimensions of 4 inches in length and 0.5 inch in diameter and having a wall thickness of 0.030 inch were employed. The $UO_2$ powder was not dispersed in any of these O.5 inch diameter capsules either in the presence or absence of uranium getters. From this example it is evident that agitation is important to dispersing the oxide in the liquid metal. Greater agitation is possible in the larger diameter capsules of the above example.

*Example III*

Uranium dioxide powder was placed in contact with liquid bismuth in a 10–10 low carbon steel cup having a one inch outside diameter, a 0.15 inch wall thickness and a length of about four inches. The mixture was heated inductively at 850 to 900° C. for about two hours in an argon atmosphere and the contents were manually agitated frequently during this heating period. The $UO_2$ was found not to be dispersed in the bismuth and was apparently not wet by the bismuth. The mixture was cooled to 25° C. and a portion of the bismuth was analyzed chemically. Only a trace of $UO_2$ was found in the bismuth. This example demonstrates that the greater agitation is not sufficient to disperse the oxide in the absence of certain reducing metal additives.

*Example IV*

A series of seven sealed 10–10 low carbon steel capsules were prepared having a two inch length, a one inch outside diameter, and a wall thickness of 0.015 inch. About ninety grams of bismuth and one gram of $UO_2$ powder was placed in each. Six different additives were added to six of the capsules respectively in an attempt to find an additive which would promote wetting and dispersal of $UO_2$ in liquid bismuth. The additives and amounts used are those indicated in the following list:

| Additive | Atomic percent added to Bi |
|---|---|
| Mg | 5 |
| Na | 5 |
| Ti | 5 |
| Li | 5 |
| Sn | 5 |
| U (as $UH_3$) | 3 |

The seventh capsule had no additive. The capsules were then sealed by arc welding in an argon atmosphere after which they were heated inductively at 750° C. for two hours in an argon atmosphere with vigorous manual shaking every twenty minutes during this time. The hydrogen in the capsule containing $UH_3$ was removed at 450 to 550° C. by diffusion through the capsule wall before heating to 750° C.

The capsules were then cooled to 25° C. and cut open. The $UO_2$ had been dispersed and the capsule walls thoroughly wetted by the bismuth containing any one of the additives Mg, Na, Ti and U. For the capsule containing no additive and those containing lithium and tin additives no apparent dispersal of $UO_2$ or wetting to any detectable extent was apparent and the capsule wall above the bismuth surface was not wet.

*Example V*

A sealed 10–10 low carbon steel capsule of the dimensions given in the previous example was prepared to contain about 90 grams of bismuth, 13 grams of $UO_2$ and 5 atomic percent of magnesium added to the bismuth. This quantity of magnesium was sufficient to reduce not more than one fifth of the $UO_2$ to uranium. The capsule was heated inductively at 750° for two hours in an argon atmosphere with vigorous shaking every twenty minutes during this time. Then the capsule was cooled to 25° C. and cut open. The $UO_2$ powder had disappeared into the bismuth and the wall of the capsule had been wet thoroughly. When the solid composition formed was broken open patches of $UO_2$ were visible in it but the large portion of the $UO_2$ seemed to have disappeared and it is concluded that it was wet by and dispersed in the liquid bismuth. From this example it is evident that $UO_2$ can be dispersed in liquid bismuth within two hours at 750° C. even where sufficient magnesium is added to reduce not more than one fifth of the $UO_2$ present; from this it should not be inferred that reduction of the $UO_2$ is the mechanism of dispersal.

In general from the behavior of the uranium oxide powder in the liquid metal compositions it appears that the addition of certain strong oxygen getters to liquid bismuth causes the powder to be wet and dispersed. Uranium metal itself will under certain circumstances cause wetting of uranium oxide powder.

The wetting and dispersal of uranium oxide in the presence of uranium metal depends on the agitation of the liquid composition. Thus for example it was possible to wet uranium oxide with uranium dissolved in bismuth in a one inch diameter capsule although this wetting did not occur under similar circumstances in a 0.5 inch diameter capsule. The difference in behavior is attributed to the more effective agitation of the composition obtained with the larger diameter capsule.

Another significant precaution to be observed in practicing the subject invention is to introduce the oxygen getter directly into the liquid bismuth because, where the uranium oxide powder is premixed with the additive powder, the $UO_2$ can coat the oxygen getter and prevent the wetting of the getter by bismuth and accordingly prevent the additive getter from carrying out its function.

A number of additives are satisfactory as indicated in the results above. The choice of the additive to be used depends largely on the use to be made of the composition formed. For example, where low thermal neutron cross-section is of concern, magnesium is the most satisfactory oxygen getter. A small amount of magnesium in liquid bismuth will disperse UO₂ powder quite completely at 500° C. or above if sufficient agitation is applied. To practice the subject invention the quantity of magnesium or other reducing agent which may be added must be an amount less than the amount which will result in the complete reduction of the metal oxide or salt to be dispersed. The addition of 5 atom percent magnesium to the bismuth phase causes wetting of the powdered inorganic compound of a metal from which nuclear power may be derived where agitation and heating are employed. The minimum amount of magnesium necessary was not determined. Where greater amounts of magnesium are added a reaction, as with the UO₂ for example, may lead to formation of complex oxides depending on the conditions to which the composition is subjected. For example, magnesium may react with uranium oxide powder to form a complex oxide according to the following equation:

$$Mg + UO_2 \rightarrow MgO \cdot UO$$

The formation of such a composition is desirable under certain circumstances as the oxygen gettering ability is incorporated in the fuel itself; the composition may be more inert toward the container materials; and may be readily wet by liquid bismuth, lead and lead-bismuth compositions.

The metals which have the capacity for gettering oxygen or other nonmetal component from uranium oxides or other compounds in liquid metal are those which will cause a reduction of at least the surface of the compound or which will be chemically attracted (e.g. chemisorbed) by the nonmetal atoms of the compound on the surface of the solid compound. It is not necessary that the agent be capable of reducing the compound. For example, sodium metal will not reduce UO₂. Where reducing agents of lower gettering ability are employed the use of higher temperatures and increased agitation is contemplated within the scope of the subject method.

Oxides of uranium, thorium and plutonium may be dispersed in liquid bismuth, lead or lead-bismuth compositions by the application of heat and agitation as described in the presence of metals such as magnesium, sodium, titanium, uranium, zirconium and aluminum. Other compounds of these metals and other reducing metals may be employed to form dispersions in liquid metal media as described.

The compositions of the subject invention may be used in the production of isotopic species from naturally occurring substances as for example in the production of fissionable material from fertile material. These reactions, as well as the production of power from the fissioning of uranium, thorium or plutonium may be carried out in connection with existing nuclear reactor facilities. For example, the composition may be contained within tubes of graphite or steel, such as those described in the examples, and inserted into the channels of nuclear reactors such as that described in the patent of Fermi, et al. No. 2,708,656 or that described in the application for patent of Powell, S.N. 449,031, now Patent No. 2,790,760 issued on April 30, 1957. In such use means for agitating the capsules of tubes containing the slurry fuel such as conventional means for rotating these tubes, as for example in an end over end manner, may be employed. Preferably the slurry compositions are contained within flow channels adapted to the circulation of liquid metals such as those described in the articles relating to a liquid metal fuel reactor described in American Institute of Chemical Engineers Symposium Series, 1954, volume 50, Nos. 11, 12 and 13. This construction is preferable in that the flow of the fluid through the loop or circulation path maintains the compounds substantially uniformly dispersed through the liquid medium and permits a more efficient removal of heat, and thus power, from the composition. Numerous other modifications and adaptations of the use of these compositions will be apparent to those familiar with this art. The ability to obtain a much higher concentration of fissionable plus fertile material using this composition than is possible with a solution of fissionable-fertile materials in liquid metal is an important characteristic of the composition. This system permits one to obtain not only the advantages of a fluid-fueled system and high thermal efficiency, but in addition makes possible the use of low enrichment fuel for the reactor.

One additional advantage of the compositions, which may be prepared in accordance with the described method, is that there is a close similarity in density between the dispersed oxide and the dispersion medium. For example there is approximately a 10% difference between the density of uranium oxide and that of bismuth, the uranium oxide being heavier than the bismuth. A fuel composed of uranium oxide dispersed in liquid bismuth could be maintained in the form of a dispersion in a circulating system due to the agitation required for circulation. Such agitation may also be employed to induce wetting of the compound to be dispersed by the liquid metal containing the additive.

As the term compound is used herein it is meant to include compounds of metals, from which nuclear power can be derived, with nonmetals. Compounds contemplated for use according to the subject method with reference to properties such as volatility and reactivity will be apparent to those skilled in this art. Compounds such as silicides, oxides, carbides of thorium, uranium and plutonium are included in this group.

Since many embodiments might be made in the present invention and since many changes might be made in the embodiment described, it is to be understood that the foregoing description is to be interpreted as illustrative only and not in a limiting sense.

We claim:
1. The method of forming a stable dispersion of thorium oxide in liquid bismuth which comprises mixing said oxide with said liquid bismuth and uranium hydride, in an amount of about three atomic percent to cause said material to be chemically sorbed on the surface of said oxide thereby causing wetting of the oxide by said liquid metal and thereafter agitating the resultant mixture, removing hydrogen therefrom and forming the stable dispersion.

2. The method of forming a stable dispersion of an oxide of a metal selected from the group consisting of uranium, thorium and plutonium in a liquid bismuth metal composition having a density close to that of the metal oxide compound which comprises forming said oxide in the finely divided state, mixing said oxide with said liquid bismuth metal, adding uranium hydride in an amount of about three atomic percent, and thereafter agitating the thus formed composition, allowing hydrogen to be withdrawn to form the stable dispersion.

3. The method of forming a dispersion of uranium oxide in liquid bismuth which comprises mixing said oxide with the bismuth and a quantity of about three atomic percent of uranium hydride sufficient to be chemisorbed on the surface of said uranium oxide to cause wetting thereof by said liquid, thereafter agitating the thus formed mixture and withdrawing hydrogen from the thus formed stable dispersion.

4. A method of forming a stable dispersion of an oxide of a metal selected from the group consisting of uranium, thorium and plutonium which comprises mixing a finely divided form of said oxide with liquid bismuth and uranium hydride, said hydride being present in an amount of about three atomic percent, to cause wetting of said oxide by the liquid bismuth and partial reduction of said oxide, bringing the thus formed mixture to a temperature of about 500° C., agitating the heated mixture, and thereafter removing hydrogen therefrom.

5. A method of forming a stable dispersion of plutonium oxide in a liquid bismuth which comprises mixing said oxide with liquid bismuth and uranium hydride in an amount of about three atomic percent to cause said material to be chemically sorbed on the surface of said oxide and thereby causing wetting of the oxide by said liquid metal, thereafter agitating the resultant mixture, thereafter withdrawing hydrogen from the thus formed stable dispersion.

References Cited in the file of this patent
UNITED STATES PATENTS

| | | |
|---|---|---|
| 2,739,375 | Coxe | Mar. 27, 1956 |
| 2,793,949 | Imich | May 28, 1957 |
| 2,840,467 | Atherton et al. | June 24, 1958 |

OTHER REFERENCES

Nucleonics, July 1954, vol. 12, No. 7, pp. 14–15. Copy in Library 204/154.35.

Nucleonics, July 1954, vol. 12, No. 7, pp. 11–13. Copy in Library 204/154.35.

Nuclear Fuels, Beckerly, 1956, pp. 307–312. Copy in Div. 46.